United States Patent
Peil et al.

(10) Patent No.: US 7,103,695 B2
(45) Date of Patent: Sep. 5, 2006

(54) SYSTEM AND METHOD FOR SCALING A BUS BASED ON A LOCATION OF A DEVICE ON THE BUS

(75) Inventors: Brian R. Peil, Austin, TX (US); Jeremey Pionke, Royal Oak, MI (US)

(73) Assignee: Dell Products L.P., Round Rock, TX (US)

(*) Notice: Subject to any disclaimer, the term of this patent is extended or adjusted under 35 U.S.C. 154(b) by 200 days.

(21) Appl. No.: 10/702,944

(22) Filed: Nov. 6, 2003

(65) Prior Publication Data
US 2005/0102463 A1    May 12, 2005

(51) Int. Cl.
*G06F 13/00*   (2006.01)
*G06F 13/36*   (2006.01)

(52) U.S. Cl. ............... 710/301; 710/311; 710/306; 710/314; 710/302

(58) Field of Classification Search ......... 710/300–317
See application file for complete search history.

(56) References Cited

U.S. PATENT DOCUMENTS

| | | | | |
|---|---|---|---|---|
| 4,727,435 A | * | 2/1988 | Otani et al. ............... | 358/296 |
| 5,628,027 A | * | 5/1997 | Belmont ........................ | 710/1 |
| 5,715,437 A | * | 2/1998 | Baker et al. ................ | 345/519 |
| 5,812,762 A | * | 9/1998 | Kim ........................... | 713/200 |
| 5,841,287 A | * | 11/1998 | Duley ......................... | 324/537 |
| 6,061,754 A | * | 5/2000 | Cepulis et al. ............. | 710/312 |
| 6,081,863 A | | 6/2000 | Kelley et al. ............... | 710/129 |
| 6,134,621 A | * | 10/2000 | Kelley et al. ............... | 710/311 |
| 6,141,708 A | | 10/2000 | Tavallaei et al. ............ | 710/62 |
| 6,237,057 B1 | | 5/2001 | Neal et al. .................. | 710/129 |
| 6,295,568 B1 | | 9/2001 | Kelley et al. ............... | 710/126 |
| 6,483,625 B1 | * | 11/2002 | Shimura et al. ............. | 398/95 |
| 6,484,222 B1 | | 11/2002 | Olson et al. ................ | 710/300 |
| 6,658,474 B1 | * | 12/2003 | Kang ......................... | 709/227 |
| 6,782,438 B1 | * | 8/2004 | Duncan et al. ............. | 710/104 |
| 6,799,238 B1 | * | 9/2004 | Miller ........................ | 710/302 |
| 6,820,164 B1 | * | 11/2004 | Holm et al. ................ | 710/312 |
| 6,883,125 B1 | * | 4/2005 | Abbondanzio et al. ..... | 714/100 |
| 2001/0018721 A1 | * | 8/2001 | McKenna et al. .......... | 710/126 |
| 2002/0108007 A1 | * | 8/2002 | Mosgrove ................... | 710/104 |
| 2003/0012186 A1 | * | 1/2003 | Rowe et al. ................ | 370/362 |
| 2003/0135675 A1 | * | 7/2003 | Pontius et al. .............. | 710/107 |
| 2004/0148542 A1 | * | 7/2004 | McAfee et al. ................ | 714/2 |
| 2005/0154814 A1 | * | 7/2005 | Kuo et al. .................. | 710/302 |

OTHER PUBLICATIONS

PCI Special Interest Group, "PCI Local Bus Specification", Revision 2.3, pp. 1-314, Mar. 29, 2002.
PCI Special Interest Group, "PCI-X Electrical and Mechanical Addendum to the PCI Local Bus Specification", Revision 2.0, pp. 1-150, Nov. 4, 2002.

* cited by examiner

*Primary Examiner*—Rehana Perveen
*Assistant Examiner*—Brian Misiura
(74) *Attorney, Agent, or Firm*—Baker Botts L.L.P.

(57) ABSTRACT

A system and method for scaling a bus based on a location of a device on the bus are disclosed. An information handling system includes a host bridge interfaced between a local bus and a peripheral bus operable to run at a plurality of bus speeds generated by the host bridge. A plurality of expansion slots are coupled to the peripheral bus and a bus switch is coupled to the peripheral bus between at least two of the expansion slots. Control logic is interfaced with the host bridge and the expansion slots. The control logic is operable to enable at least one of the expansion slots based on a signal received from each of the expansion slots by manipulating the bus switches.

22 Claims, 2 Drawing Sheets

| M66_EN | PCIX_CAP VOLTAGE | | | DEVICE POSITION IN EXPANSION SLOTS | | | | BUS SPEED |
|---|---|---|---|---|---|---|---|---|
| | CV | 1/2 CV | 0 | SLOT 20a | SLOT 20b | SLOT 20c | SLOT 20d | |
| X | X | X | X | X | X | X | Y | 33 MHz |
| X | X | X | X | X | X | Y | X | 33 MHz |
| X | 1 | 0 | 0 | X | Y | N | N | 66 MHz |
| X | 0 | 1 | 0 | X | Y | N | N | 66 MHz |
| 1 | 0 | 0 | 1 | X | Y | N | N | 66 MHz |
| 0 | 0 | 0 | 1 | X | Y | N | N | 33 MHz |
| X | X | X | X | X | Y | Y | X | 33 MHz |
| X | X | X | X | X | Y | X | Y | 33 MHz |
| X | 1 | 0 | 0 | Y | N | N | N | 133 MHz |
| X | 0 | 1 | 0 | Y | N | N | N | 66 MHz |
| 1 | 0 | 0 | 1 | Y | N | N | N | 66 MHz |
| 0 | 0 | 0 | 1 | Y | N | N | N | 33 MHz |
| X | X | X | X | Y | X | Y | X | 33 MHz |
| X | X | X | X | Y | X | X | Y | 33 MHz |

SYSTEM AND METHOD FOR SCALING A BUS BASED ON A LOCATION OF A DEVICE ON THE BUS

TECHNICAL FIELD

The present disclosure relates in general to an information handling system, and more particularly to a system and method for scaling a bus based on a location of a device on the bus.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a local bus for connecting peripheral devices to expand the functionality of the system. One such local bus may be a parallel bus, such as the Peripheral Component Interconnect (PCI) bus. Typically, a bus bridge and multiple expansion slots are connected to the PCI bus. The bus bridge functions to provide an interface between a CPU local bus and the PCI bus by controlling signals communicated between the local bus and the PCI bus. Peripheral devices may be added to the information handling system by inserting the peripheral devices into the expansion slots connected to the PCI bus.

Originally, the PCI bus operated at a single bus speed of approximately 33 MHz. Consequently, peripheral devices intended for use on the PCI bus were designed to operate at the original bus speed. Through advances in technology, the PCI bus became capable of operating at higher bus speeds. Additionally, peripheral devices intended for use on the PCI bus were also designed for use at the higher bus speeds. However, peripheral devices not capable of operating at the higher bus speeds may still be used in certain systems to reduce the cost and support backward compatibility. The PCI bus, therefore, typically supports multiple bus speeds.

In order to support the higher bus speeds, the number of expansion slots in the system must be reduced. The reduction in the number of expansion slots is due to loading constraints required by timing and signal integrity guidelines for the PCI bus as defined by the industry standard PCI specifications. Consequently, a system that supports multiple bus speeds on the same PCI bus may only have a limited number of expansion slots connected to the PCI bus.

In certain circumstances, a user of an information handling system may want the option of operating the PCI bus at more than one bus speed. Previous solutions have resolved the contention between maximizing the number of expansion slots in a system and operating the PCI bus at a higher bus speed by determining whether a peripheral device is present in each of the expansion slots in the system and determining whether the devices are capable of operating at the higher bus speeds. If the peripheral devices can operate at the higher bus speeds and the host bridge is capable of driving the number of peripheral devices in the system at the higher bus speeds, the bridge drives the PCI bus at the highest possible bus speed. These solutions, however, fail to take into account that the load associated with empty expansion slots may reduce the performance of the bus if the bus is operated at a higher bus speed.

SUMMARY

In accordance with the present invention, the disadvantages and problems associated with operating a bus at multiple bus speeds have been substantially reduced or eliminated. In a particular embodiment, an information handling system is disclosed that enables at least one of a plurality of expansion slots based on a signal received from the plurality of expansion slots by manipulating a corresponding bus switch.

In accordance with one embodiment of the present invention, an information handling system includes a host bridge interfaced between a local bus and a peripheral bus that operates at a plurality of bus speeds generated by the peripheral bus. A plurality of expansion slots are coupled to the peripheral bus and a bus switch is coupled to the peripheral bus between at least two of the expansion slots. Control logic interfaced with the host bridge and the expansion slots enables at least one of the expansion slots based on a signal received from each of the expansion slots by manipulating the bus switches.

In accordance with another embodiment of the present invention, an information handling system includes a local bus interfaced with a processor and a peripheral component interconnect (PCI) bus that operates at multiple bus speeds. A host bridge that drives the PCI bus at the multiple bus speeds is interfaced between the local bus and the PCI bus. A plurality of expansion slots are coupled to the PCI bus and a bus switch is coupled to the PCI bus between at least two of the expansion slots. Control logic interfaced with the host bridge and the expansion slots enables at least one of the expansion slots based on a location of a peripheral device inserted into at least one of the expansion slots by manipulating the bus switches.

In accordance with a further embodiment of the present invention, a method for scaling a bus based on a location of a device on the bus includes receiving a signal from each of a plurality of expansion slots coupled to a peripheral bus, and determining a location of a peripheral device inserted into at least one of the expansion cards and an operating speed for the peripheral device based on the received signals. At least one of the expansion slots is enabled and a bus speed is selected based on the location of the peripheral device by manipulating a corresponding bus switch coupled to the peripheral bus between at least two of the expansion slots. The selected bus speed for the peripheral bus is communicated to a host bridge that drives the peripheral bus at the selected bus speed and that is interfaced between the peripheral bus and a local bus.

Important technical advantages provided by certain embodiments of the present disclosure include control logic that allows a user of an information handling system to determine a bus operating speed after purchasing the system. Traditionally, a user and/or manufacturer had to choose either expansion capability or high-speed performance before purchasing a system. The present invention, however, allows the manufacturer to configure and the user to purchase a system having the maximum amount of expansion slots and then decide how those expansion slots will be used. Control logic in the system dynamically selects a bus speed based on a location of a peripheral device on the bus and/or a maximum operating speed for the peripheral bus.

Another important technical advantage provided by certain embodiments of the present disclosure includes control logic that notifies a user of which expansion slots in an information handling system are enabled. Slot indicators associated with each of the expansion slots are illuminated when the corresponding expansion slot is enabled. A user desiring to expand the functionality of the system by adding peripheral devices may use the slot indicators to determine where to place the peripheral devices. Additionally, the slot indicators may notify the user of the bus speed for the peripheral bus such that the user can select a peripheral device that operates at the indicated bus speed.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 2:
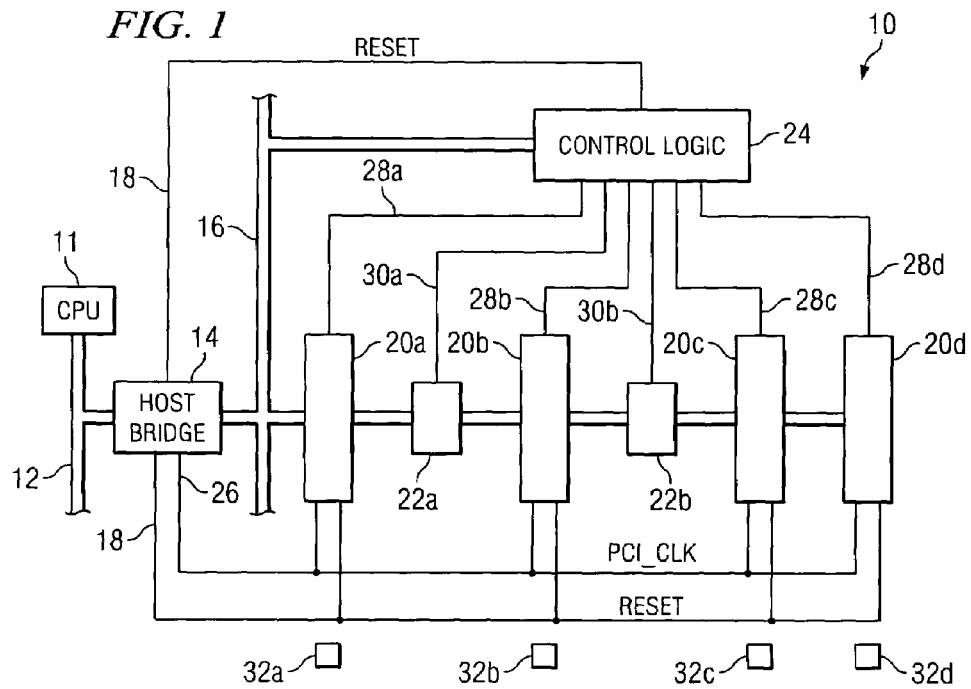
FIG. 1 illustrates a block diagram of an information handling system that is capable of scaling a bus based on a location of a device on the bus in accordance with teachings of the present invention.
FIG. 2 illustrates a truth table for the information handling system of FIG. 1.
Figure 3:
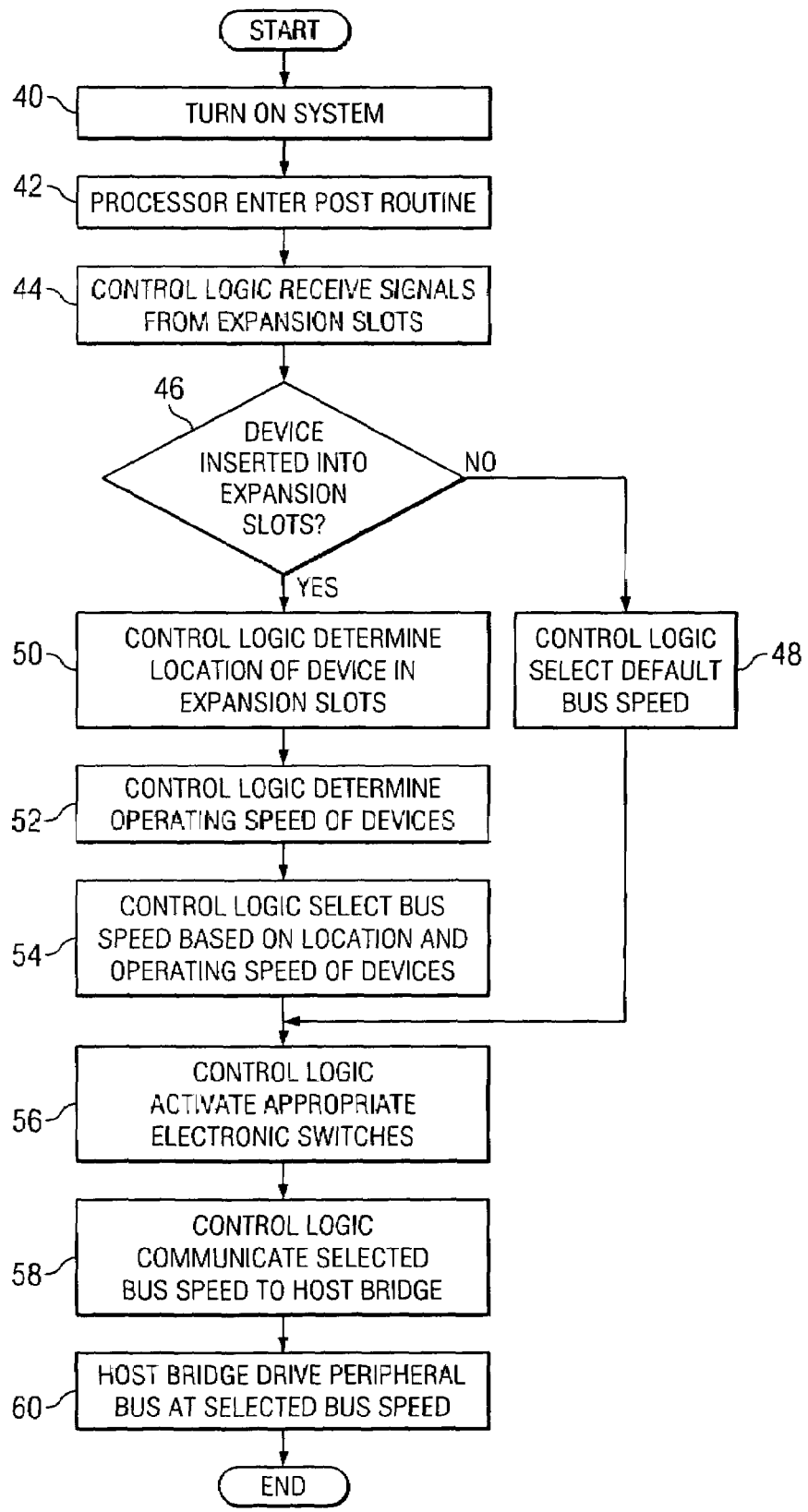
FIG. 3 illustrates a flow chart of a method for scaling a bus based on a location of a device on the bus in accordance with teachings of the present invention.

Preferred embodiments and their advantages are best understood by reference to FIGS. 1 through 3, wherein like numbers are used to indicate like and corresponding parts.

In particular, the present disclosure concerns a system and method for scaling a bus in an information handling system based on a location of a device on the bus. During a conventional power-on self-test (POST) routine, an information handling system may determine if expansion slots coupled to a peripheral component interconnect (PCI) bus are populated with peripheral devices. Typically, the number and type of peripheral devices may be used to determine a bus speed for the PCI bus.

The information handling system provided by the present disclosure includes control logic that scales the PCI bus based on the position of the expansion slot on the PCI bus that contains a peripheral device. The control logic scales the PCI bus by enabling at least one of the expansion slots connected to the PCI bus based on a signal received from each of the expansion slots. The control logic further uses the signals from the expansion slots to activate (e.g., close) or deactivate (e.g., open) the appropriate bus switches. If a bus switch is activated, the expansion slots located on the PCI bus after the activated switch are connected to the PCI bus. If a bus switch is deactivated (e.g., open), the expansion slots located on the PCI bus after the deactivated switch are not connected to the PCI bus. Thus, a host bridge driving the PCI bus does not see the load associated with the deactivated expansion slots. The control logic further determines the bus speed for the PCI bus based on the number of expansion slots that have been enabled.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, a block diagram of an information handling system including control logic that scales a bus based on a location of a device on the bus is illustrated. Information handling system 10 includes processor 11 interfaced with local bus 12, host bridge 14 interfaced between local bus 12 and PCI bus 16, expansion slots 20a, 20b, 20c, and 20d (generally referred to as expansion slots 20), bus switches 22a and 22b (generally referred to as bus switches 22) and control logic 24. In one embodiment, control logic 24 enables at least one of expansion slots 20 based on a signal received from expansion slots 20 indicating what types of devices, if any, are inserted in expansion slots 20. Control logic 24 actives the appropriate bus switches 22 based on the location of the devices and further selects a bus speed for PCI bus 16 based on which of bus switches 22 are activated.

Processor 11 may be a microprocessor, a microcontroller, a digital signal processor (DSP) or any other digital circuitry configured to communicate control and data signals to and from other components coupled to local bus 12. Host bridge 14 operates to provide an interface between local bus 12 and PCI bus 16 such that signals may be transferred from processor 11 to devices inserted into expansion slots 20 on PCI bus 16. Host bridge 14 may be part of a chipset associated with processor 11 or host bridge 14 may be a stand alone device. Host bridge 14 may generate RESET signal 18 that disables all of expansion slots 20 during a POST routine.

Host bridge 14 additionally may include a clock driver that provides PCI_CLK signal 26 for any devices inserted into expansion slots 20 on PCI bus 16. Although PCI_CLK signal 26 is illustrated as a stand alone signal separate from PCI bus 16, PCI_CLK signal 26 may also be provided as a part of PCI bus 16. PCI_CLK signal 26 determines the bus speed at which the devices inserted in expansion slots 20 operate. Host bridge 14 may generate PCI_CLK signal 26 that drives PCI bus 16 at multiple different bus speeds. In one embodiment, the bus speeds may be approximately 33 MHz, approximately 66 MHz and approximately 133 MHz. In other embodiments, PCI_CLK signal 26 may operate PCI bus 16 at more than or less than three different bus speeds. For example, PCI bus 16 may additionally operate at bus speeds of approximately 266 MHz, approximately 533 MHz and any other suitable bus speed defined in the industry standard specifications.

Expansion slots 20 may receive peripheral devices that provide additional functionality to information handling system 10 when the peripheral devices are inserted. The peripheral devices may be PCI devices or PCI-X devices that provide functionality including, but not limited to, a network interface, a modem, sound, graphics, and mass storage device interfaces (e.g., Small Computer System Interfaces (SCSI) or Integrated Drive Electronics (IDE) interfaces) for floppy and hard disk drives, tape drives, CD-ROM drives, or DVDs.

Expansion slots 20 may be coupled to PCI bus 16 and may allow processor 11 through host bridge 14 to configure and communicate with the peripheral devices. Expansion slots 20 may also be configured to be hot plug compatible, which allows additional peripheral devices to be easily added to information handling system 10. In expansion slots implementing the hot-plug capability of the PCI industry specifications, plug-and-play devices may be added without powering down information handling system 10 because the operating system automatically recognizes the plug-and-play device and sends device configuration information to the added plug-and-play device. In addition, control logic 24 may automatically adjust the bus speed of PCI bus 16 when the play-and-play device is added to information handling system 10.

Bus switches 22 (also known as quick switches) may be any type of switch (e.g., a field effect transistor (FET) switch) that turns "on" or closes to allow an electric signal to pass through the switch and turns "off" or opens to block an electric signal from being transferred through the switch. In the illustrated embodiment, bus switch 22a may be coupled to PCI bus 16 between expansion slots 20a and 20b and bus switch 22b may be coupled to PCI bus 16 between expansion slots 20b and 20c. In other embodiments, an additional bus switch may be coupled to PCI bus 16 before expansion slot 20a and/or between expansion slots 20c and 20d.

Expansion slots 20 and may operate to isolate portions of PCI bus 16. For example, if bus switch 22a is "on" or activated and bus switch 22b is "off" or deactivated, signals transferred by host bridge 14 on PCI bus 16 may be communicated to expansion slots 20a and 20b because bus switch 22a is activated. The signals will not be communicated to expansion slots 20c and 20d because bus switch 22b is deactivated. By deactivating bus switch 22b, expansion slots 20c and 20d, in addition to the wire stubs associated with PCI bus 16 after bus switch 22b, are isolated from the remainder of PCI bus 16 such that the load associated with expansion slots 20c and 20d is removed from PCI bus 16.

Information handling system 10 further includes control logic 24 interfaced with PCI bus 16. In one embodiment, control logic 24 may be a programmable array logic (PAL) device that can be programmed by a user to provide specific output signals based on a combination of input signals. In other embodiments, control logic 24 may be formed from other electronic components, such as a microprocessor or other programmable devices. In yet another embodiment, control logic 24 may be formed from discrete electronic components or other combinatorial logic circuitry.

In operation, processor 11 executes a POST routine, for example, when information handling system 10 is turned on. During the POST routine, RESET signal 18 disables expansion slots 20 and enables control logic 24 to analyze the signals received from expansion slots 20. Control logic 24 receives device signals 28a, 28b, 28c and 28d (generally referred to as device signals 28) respectively from expansion slots 20a, 20b, 20c and 20d. Device signals 28 may indicate if a peripheral device is inserted in expansion slots 20 and may indicate the maximum operating speed of the peripheral device.

For example, device signals 28 may include PRSNT[1:2]# signals generated by expansion slots 20 containing peripheral devices, as defined by the industry standard PCI specifications. The PRSNT signals associated with each of expansion slots 20 indicate whether a peripheral device is physically present in the expansion slot and identify the type of peripheral device by indicating the maximum current used by the peripheral device. When no peripheral device is present in an expansion slot, the state of both bits of the PRSNT signals is a logic 1. When a peripheral device is present in the expansion slot, at least one of the bits is a logic 0. Table 1 shows the possible combinations for the two bits. As shown in the table, the type of peripheral device present in the expansion slot is indicated by which bit has a value of logic 0.

TABLE 1

|  | PRSNT [2]# | PRSNT[1]# |
| --- | --- | --- |
| Device present, 7.5 W max | 0 | 0 |
| Device present, 15 W max | 0 | 1 |
| Device present, 25 W max | 1 | 0 |
| No peripheral device | 1 | 1 |

Device signals 28 may additionally include, but are not limited to, M66EN and/or PCIXCAP as defined by the industry standard PCI specifications. The M66EN signal associated with each of expansion slots 20 indicates whether the peripheral device is capable of operating at a bus speed of approximately 66 MHz. If the M66EN signal has a value of a logic 1, the peripheral device can operate at a bus speed of approximately 66 MHz. If the M66EN signal has a value of a logic 0, the peripheral device can only operate at the lower bus speed of approximately 33 MHz. In one embodiment, a value of logic 1 may be represented by a high voltage and a value of logic 0 may be represented by a low voltage.

The PCIXCAP signal associated with each of expansion slots 20 indicates whether the peripheral device is a PCI-X device and the bus speed at which the peripheral device operates. In one embodiment, the peripheral device may include a pull-down resistor in parallel with a capacitor. If the peripheral device is a PCI-X device that operates at a bus speed of approximately 133 MHz, the PCIXCAP signal will have a value approximately equal to the core voltage for information handling system 10. If the peripheral device is a PCI-X device that operates at a bus speed of approximately 66 MHz, the PCIXCAP signal will have a value approximately equal to one half of the core voltage. If the peripheral device is a PCI device that operates at a bus speed of approximately 33 MHz, the PCIXCAP signal will have a value approximately equal to zero volts.

Based on the combination of PRSNT signals, M66EN signals and PCIXCAP signals received from each of expansion slots 20, control logic 24 determines the location of any peripheral devices inserted into expansion slots 20 and the operating speed for those peripheral devices. As described in more detail below in reference to FIG. 2, control logic 24 manipulates bus switches 22 based on the location and operating speed of the peripheral devices. For example, if control logic 24 determines that a peripheral device inserted into expansion slot 20a is capable of operating at approximately 133 MHz, and control logic 24 determines that expansion slots 20b, 20c and 20d are empty, control logic 24 does not activate any of bus switches 22 because expansion slots 20b, 20c and 20d are not being used. Thus, only expansion slot 20a is enabled and control logic selects a bus speed of approximately 133 MHz.

However, if control logic 24 determines that a peripheral device is inserted into expansion slot 20d and expansion slots 20a, 20b and 20c are empty, control logic 24 actives both of bus switches 22 through switch signals 30a and 30b (generally referred to as switch signals 30) such that signals being transferred on PCI bus 16 are communicated to the peripheral device in expansion slot 20d. Thus, all of expansion slots 20 are enabled and control logic 24 automatically selects a bus speed of approximately 33 MHz even if the peripheral device inserted into expansion slot 20d is capable of operating at a higher speed.

Information handling system 10 may additionally include slot indicators 32a, 32b, 32c and 32d (generally referred to as slot indicators 32) that indicate whether the corresponding expansion slot is operational. In one embodiment, slot indicators 32 may be LEDs that are illuminated when the corresponding expansion slot is enabled and not illuminated when the corresponding expansion slot is disabled. As described above, if all of bus switches 22 are deactivated, only indicator 32a will be on to indicate that expansion slot 22a is enabled. In other embodiments, slot indicators 32 may be graphically represented on a display device coupled to information handling system 10. The display device may a liquid crystal device (LCD), cathode ray tube, or other display device suitable for creating graphic images and alphanumeric characters recognizable to a user. Although not expressly illustrated in FIG. 1, slot indicators 32 may be turned on or off by signals generated by control logic 24. For example, control logic 24 may use switch signals 30 to determine which of slot indicators 32 should be on. If switch signal 30a activates switch 22a, control logic 24 may illuminate slot indicators 32a and 32b since both of expansion slots 20a and 20b are enabled.

Processor 11, bus bridge 14, expansion slots 20, bus switches 22 and control logic may be located either on the motherboard (not expressly shown) of information handling system 10 or on a circuit board, such as a riser card, daughter card, or backplane, coupled to the motherboard. Further, although FIG. 1 illustrates four expansion slots, the present invention is not limited to any particular number of expansion slots, and thus greater or fewer expansion slots may be provided in the system as desired.

FIG. 2 illustrates a truth table for control logic 24 of information handling system 10 illustrated in FIG. 1. The first column includes the corresponding possible values for the M66EN signal. In this column, an X represents a don't care condition, a logic 1 indicates that the signal is active and the peripheral device is capable of operating at approximately 66 MHz, and a logic 0 indicates that the signal is not active and the peripheral device is only capable of operating at approximately 33 MHz. The second column includes the corresponding possible values for the PCIXCAP signal. As described above, the PCIXCAP signal has three possible voltage levels (e.g., the core voltage, half of the core voltage and zero volts). In this column, an X represents a don't care condition and a logic 1 indicates that the PCIXCAP signal has the corresponding voltage level and that the peripheral device has a operating speed corresponding to the voltage level. The third column includes the possible locations for a peripheral device coupled to PCI bus 16. In this column, an X represents a don't care condition, a Y represents that a peripheral device is present in the corresponding expansion slot and a N represents that the corresponding expansion slot is empty. The fourth column includes the possible bus speeds for PCI bus 16 based on device signals 28 received from expansion slots 20 and the location of peripheral devices in expansion slots 20.

As illustrated in the table, if a peripheral device is located in either of expansion slots 20c or 20d, control logic 24 selects a bus speed of approximately 33 MHz regardless of the operating speed of the peripheral device located in expansion slots 20c or 20d. The bus speed is limited to the lowest speed because the loading constraints for the higher bus speeds would be violated if more than two expansion slots were enabled for use on PCI bus 16.

As shown, if a peripheral device is located in expansion slot 20b, control logic 24 evaluates the values of device signals 28. If the PCIXCAP signal has a voltage level approximately equal to the core voltage or one half of the core voltage, the bus speed is set to 66 MHz regardless of the value of the M66EN signal. In this example, the bus speed is limited to the middle bus speed due to loading constraints that would be violated if expansion slot 20c were enabled. If the PCIXCAP signal has a voltage level approximately equal to zero volts, control logic 24 analyzes the M66EN signal. If the M66EN signal has a value of logic 1, the peripheral device is capable of operating at the middle bus speed and control logic 24 selects a bus speed of approximately 66 MHz. If the M66EN signal has a value of logic 0, the peripheral device is not capable of operating at the middle bus speed and control logic 24 selects the lowest bus speed (e.g., approximately 33 MHz).

Referring still to FIG. 2, if a peripheral device is located in expansion slot 20a and all the rest of expansion slots 20 are empty, control logic 24 determines the values of the M66EN signal and the PCIXCAP signal. If the PCIXCAP signal has a voltage level approximately equal to the core voltage, control logic 24 selects the highest bus speed (e.g., approximately 133 MHz). If the PCIXCAP signal has a voltage level approximately equal to one half of the core voltage, control logic 24 selects the middle bus speed (e.g., approximately 66 MHz) If the PCIXCAP signal has a voltage level approximately equal to zero volts, control logic 24 analyzes the M66EN signal. If the M66EN signal has a value of logic 1, control logic 24 selects the middle bus speed (e.g., approximately 66 MHz). If the M66EN signal has a value of logic 0, control logic 24 selects the lowest bus speed (e.g., approximately 33 MHz).

Finally, if control logic determines that a peripheral device is located in expansion slot 20a and either of expansion slots 20c or 20d, control logic 24 selects a bus speed of approximately 33 MHz. As shown by the table, a peripheral device operating at the highest bus speed may only be placed in expansion slot 20a due to loading restrictions in order for the bus speed to be operated at the highest speed. A peripheral device operating at a middle bus speed may either be placed in expansion slots 20a and/or 20b. Again, the restriction is due to loading restrictions at the middle bus speed. Finally, a peripheral device operating at the lowest bus speed may be placed in any of expansion slots 20 since the loading restrictions for the lowest bus speed is not violated.

Although not expressly show in the table, control logic 24 may further enable one or more of expansion slots 20 based on the selected bus speed. If the bus speed is approximately equal to 133 MHz, control logic 24 enables only expansion slot 20a by not activating any of bus switches 22. If the bus speed is approximately equal to 66 MHz, control logic 24 may enable both of expansion slots 20a and 20b by activating bus switch 22a. In another embodiment, if there is only one peripheral device capable of operating at 66 MHz inserted in expansion slot 20a, control logic 24 may only enable expansion slot 20a since expansion slot 20b is empty and the additional load could effect the performance of the bus since it is not being used. If the bus speed is approximately equal to 33 MHz, control logic 24 may enable all of expansion slots 20 by activating both of bus switches 22a and 22b. In another embodiment, if there is only one peripheral device capable of operating at 33 MHz inserted in expansion slot 20a, control logic 24 may only enable expansion slot 20a to reduce the load on and increase the performance of PCI bus 16.

FIG. 3 illustrates a flow chart of a method for scaling a bus based on a location of a device. Generally, control logic 24 determines if expansion slots 20 are populated with peripheral devices during a power-on self-test (POST) routine. If control logic 24 detects a peripheral device in at least one of expansion slots 20, control logic 24 determines the location of the peripheral device on PCI bus 16 and determines the operating speed for the peripheral device based on signals received from expansion slots 20. Control logic 24 then activates one or more of bus switches 22 based on the determined location. Control logic 24 further selects a bus speed for PCI bus 16 based on the location and operating speed of the peripheral device.

At step 40, information handling system 10 is turned on and processor 11 initiates a boot sequence. During the boot sequence, processor 11 executes a POST routine to determine if any peripheral devices are inserted into expansion slots 20 at step 42. During the POST routine, RESET signal 18 disables expansion slots 20 and initiates operation of control logic 24. At step 44, control logic 24 receives device signals 28 from expansion slots 20. Device signals 28 may indicate if a peripheral device is located in any one of expansion slots 20 and may additionally provide information about the type of peripheral device inserted in expansion slots 20. In one embodiment, device signals 28 may include the PRSNT signals, the M66EN signal and the PCIXCAP signal as described in the industry standard PCI specifications.

At step 46, control logic 24 uses device signals 28 to determine if any peripheral devices are inserted into any of expansion slots 20. If control logic 24 does not detect any peripheral devices in expansion slots 20, control logic 24 selects a default bus speed for PCI bus 16 at step 48. In one embodiment, the default bus speed may be the lowest bus speed such that any peripheral device inserted into expansion slots 20 may operate correctly. In another embodiment, the default bus speed may be the highest bus speed such that a peripheral device may only be inserted into expansion slot 20a. In either embodiment, the user is notified which of expansion slots 20 are enabled by slot indicators 32. The user, therefore, may insert a peripheral device in one of the enabled expansion slots after information handling system 10 has been turned on.

If control logic 24 detects that a peripheral device is inserted in at least one of expansion slots 20, control logic 24 determines the location of the peripheral device on PCI bus 16 based on device signals 28 received from expansion slots 20. For example, peripheral devices may be inserted in expansion slots 20a and 20b. Control logic 24 may use the PRSNT signals associated with each of device signals 28 to determine whether a peripheral device is present in the corresponding expansion slot. In this example, the PRSNT signals associated with device signals 28a and 28b may have values indicating that a peripheral device is physically present in expansion slots 20a and 20b while the PRSNT signals associated with device signals 28c and 28d may have values indicating that expansion slots 20c and 20d are empty. As described above in reference to Table 1, if either of the PRSNT signals has a value of logic 0, a peripheral device is inserted into the corresponding expansion slot and if both of the PRSNT signals have a value of logic 1, the corresponding expansion slot is unoccupied.

At step 52, control logic 24 further uses devices signals 28 to determine the maximum operating speed of the peripheral devices inserted into expansion slots 20. In one embodiment, the M66EN signals and PCIXCAP signals associated with device signals 28 may indicate the maximum operating speed of the peripheral devices. Using the example above, control logic 24 may receive the M66EN signal and the PCIXCAP signal from expansion slots 20a and 20b since the PRSNT signals indicated that peripheral devices were inserted into expansion slots 20a and 20b. Since control logic 24 determined that expansion slots 20c and 20d were empty, control logic 24 does not analyze the M66EN signals and the PCIXCAP signals associated with device signals 28c and 28d. In one embodiment, the peripheral device inserted in expansion slot 20a may have a maximum operating speed of approximately 133 MHz and the peripheral device inserted in expansion slot 20b may have a maximum operating speed of approximately 66 MHz. In other embodiments, the peripheral devices may have higher or lower operating speeds depending on the type of peripheral device.

At step 54, control logic 24 selects a maximum bus speed for PCI bus 16 based on the location of the peripheral devices in expansion slots 20 and/or the operating speed of the peripheral devices. Using the truth table illustrated in FIG. 2, if a peripheral device is inserted into expansion slot 20b, the maximum bus speed for PCI bus 16 is limited to 66 MHz based on the loading constraints described in the industry standard PCI specifications. Additionally, control logic 24 may select a bus speed based on the lowest operating speed of the peripheral devices inserted into expansion slots 20. In the described example, control logic 24 may select a bus speed of approximately 66 MHz because a peripheral device is inserted into expansion slot 20b and/or the maximum operating speed of the peripheral device inserted into expansion slot 20b is approximately 66 MHz.

Once control logic 24 selects either a default bus speed if no peripheral devices are inserted into expansion slots 20 or a bus speed based on the location of peripheral devices in expansion slots 20, control logic 24 activates bus switches 22 such that signals on PCI bus 16 may be communicated to any peripheral devices located in expansion slots 20 at step 56. In the described embodiment control logic 24 may active bus switch 22a since peripheral devices are present in both expansion slots 20a and 20b. Bus switch 22b may remain deactivated because no peripheral devices are inserted into expansion slots 20*c* and 20*d*. Additionally, bus switch 22*b* remains deactivated due to loading constraints associated with operating PCI bus 16 at a bus speed of approximately 66 MHz. Since bus switch 22*b* remains open or off, host bridge 14 does not "see" expansion slots 20*c* and 20*d* and the performance of PCI bus 16 is unaffected by the load associated with expansion slots 20*c* and 20*d*.

At step 58, control logic 24 communicates the selected bus speed to host bridge 14. Host bridge 14 uses the selected bus speed to activate PCI_CLK signal 26 such that the correct bus speed is communicated to the peripheral devices in expansion slots 20. As previously described, even if one of the peripheral devices is capable of operating at a speed higher than the selected bus speed, PCI_CLK signal 26 may cause the peripheral device to operate at the lower bus speed.

Although the disclosed embodiments have been described in detail, it should be understood that various changes, substitutions and alterations can be made to the embodiments without departing from their spirit and scope.

What is claimed is:

1. An information handling system, comprising:
   a local bus;
   a peripheral bus operable to run at a plurality of bus speeds;
   a host bridge interfaced between the local bus and the peripheral bus, the host bridge operable to drive the peripheral bus at the plurality of bus speeds;
   a plurality of expansion slots coupled to the peripheral bus;
   a bus switch coupled to the peripheral bus between at least two of the expansion slots; and
   control logic interfaced with the host bridge and the expansion slots, the control logic operable to:
      enable at least one of the expansion slots based on a signal received from each of the expansion slots by manipulating the bus switches; and
      select one of the plurality of bus speeds based on a location of the at least one enabled expansion slot populated with a peripheral device on the peripheral bus.

2. The system of claim 1, further comprising the control logic operable to select one of the plurality of bus speeds based on the enabled expansion slot.

3. The system of claim 2, further comprising the control logic operable to communicate a signal to the host bridge representing the selected bus speed.

4. The system of claim 1, wherein the plurality of bus speeds comprises a lower bus speed and a higher bus speed.

5. The system of claim 4, further comprising the control logic operable to select the higher bus speed if all of the bus switches are deactivated.

6. The system of claim 4, further comprising the control logic operable to select the lower bus speed if all of the bus switches are activated.

7. The system of claim 1, further comprising:
   a peripheral device inserted into at least one of the expansion slots; and
   the control logic operable to determine a maximum operating speed for the peripheral device.

8. The system of claim 1, further comprising a slot indicator associated with each of the expansion slots, the slot indicators operable to indicate the selected bus speed.

9. The system of claim 1, wherein the peripheral bus comprises a peripheral component interconnect (PCI) bus.

10. The system of claim 1, further comprising a slot indicator associated with each of the expansion slots, the slot indicators operable to indicate if a corresponding expansion slot is enabled.

11. An information handling system, comprising:
    a local bus interfaced with a processor;
    a peripheral component interconnect (PCI) bus operable to operate at a plurality of bus speeds;
    a host bridge interfaced between the local bus and the PCI bus, the host bridge operable to drive the PCI bus at the plurality of bus speeds;
    a plurality of expansion slots coupled to the PCI bus;
    a bus switch coupled to the PCI bus between at least two of the expansion slots; and
    control logic interfaced with the host bridge and the expansion slots, the control logic operable to:
       enable at least one of the expansion slots based on a location of a peripheral device inserted into at least one of the expansion slots by manipulating the bus switches; and
       select one of the plurality of bus speeds based on a location of the at least one enabled expansion slot populated with a peripheral device on the PCI bus.

12. The system of claim 11, further comprising the control logic operable to select one of the plurality of bus speeds based on the location of the peripheral device.

13. The system of claim 11, further comprising the control logic operable to receive a signal from each of the expansion slots, the received signals operable to indicate if a peripheral device is inserted into a corresponding expansion slot and a maximum operating speed for the peripheral device.

14. The system of claim 11, wherein the plurality of bus speeds comprises a lower bus speed and a higher bus speed.

15. The system of claim 14, further comprising the control logic operable to select the higher bus speed if all of the bus switches are open.

16. The system of claim 14, further comprising the control logic operable to select the lower bus speed if all of the bus switches are closed.

17. The system of claim 11, further comprising a slot indicator associated with each of the expansion slots, the slot indicators operable to indicate if the expansion slots are enabled.

18. A method for scaling a bus based on a location of a peripheral device on the bus, comprising:
    receiving a signal from each of a plurality of expansion slots coupled to a peripheral bus, the received signals operable to indicate if a peripheral device is inserted into at least one of the expansion slots and an operating speed for the peripheral device;
    determining a location of the peripheral device on the peripheral bus based on the received signals;
    enabling at least one of the expansion slots based on the location of the peripheral device by manipulating a corresponding bus switch coupled to the peripheral bus between at least two of the expansion slots;
    selecting a bus speed for the peripheral bus based on the location of the peripheral device; and
    communicating the bus speed for the peripheral bus to a host bridge interfaced between the peripheral bus and a local bus, the host bridge operable to drive the peripheral device at the selected bus speed.

19. The method of claim 18, wherein the peripheral bus is operable to be run at a plurality of bus speeds, the plurality of bus speeds including a lower bus speed and a higher bus speed.

20. The method of claim 19, further comprising selecting the higher bus speed if all of the bus switches are deactivated.

21. The method of claim 19, further comprising selecting the lower bus speed if all of the bus switches are activated.

22. The method of claim 18, wherein the peripheral bus comprises a peripheral component interconnect (PCI) bus.

* * * * *